No. 620,098. Patented Feb. 28, 1899.
J. BRODERICK.
LAWN MOWER.
(Application filed June 24, 1897.)
(No Model.)
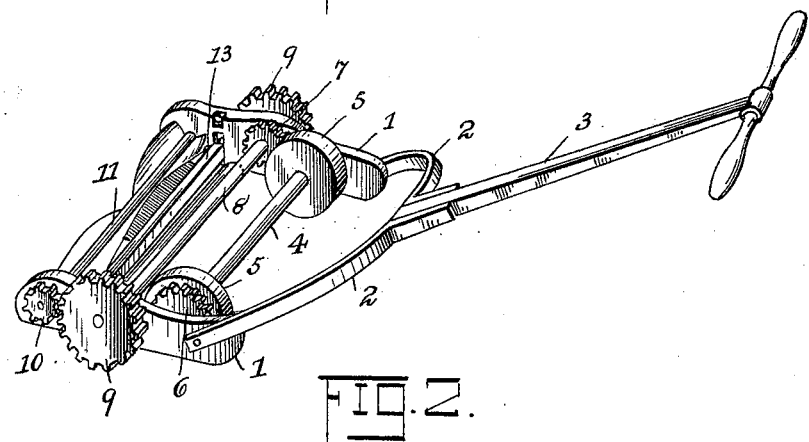
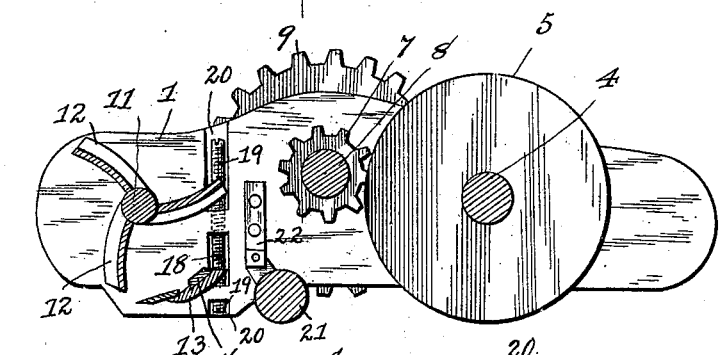
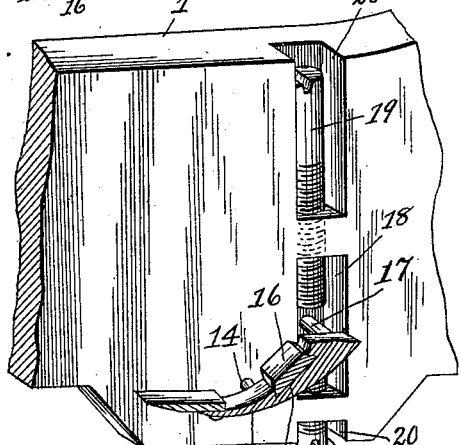
Witnesses
Sam R. Turner
John Lacry Phillips.
Inventor
James Broderick.
By James A. Bevans
his Attorney
THE NORRIS PETERS CO., PHOTO-LITHO., WASHINGTON, D. C.

UNITED STATES PATENT OFFICE.

JAMES BRODERICK, OF WINTER HARBOR, MAINE.

LAWN-MOWER.

SPECIFICATION forming part of Letters Patent No. 620,098, dated February 28, 1899.

Application filed June 24, 1897. Serial No. 642,087. (No model.)

*To all whom it may concern:*

Be it known that I, JAMES BRODERICK, of Winter Harbor, in the county of Hancock and State of Maine, have invented certain new and useful Improvements in Lawn-Mowers; and I do hereby declare the following to be a full, clear, and exact description of the invention, such as will enable others skilled in the art to which it appertains to make and use the same.

This invention relates to improvements in lawn-mowers; and the object thereof is to provide a simple and improved construction of mower having in connection therewith a sharpening device by means of which the cutters may be quickly and readily sharpened without removal from the machine.

With the above object in view the invention consists in the novel details of construction, which are fully described in the specification, particularly pointed out in the claims, and clearly illustrated by the accompanying drawings, in which—

Figure 1 is a perspective view of a lawn-mower embodying my invention. Fig. 2 is an enlarged longitudinal sectional view of the same. Fig. 3 is an enlarged detail perspective view showing the adjustment for the cutter-bar.

The frame of the mower consists of the side pieces 1, having the curved braces 2, secured thereto at the rear ends thereof, said braces at their opposite ends being attached to the handle 3. Journaled in said side pieces adjacent to the rear end of the frame is a shaft 4, upon which the ground-wheels 5 are mounted on the inside of said frame and having the cogged disks 6 secured to or formed on their outer faces. These disks mesh with pinions 7 upon a shaft 8, journaled in the frame slightly in advance of shaft 4, and having its ends projecting through said side pieces, and carrying gears 9 meshing with pinions 10 on the projecting ends of the cutter-shaft 11, which is journaled in the frame at the forward end thereof and carries the spiral cutters 12.

The cutter-bar 13 has the trunnions 14 projecting centrally from its respective ends and engaging bearings formed in the side pieces of the frame, so that said bar is pivoted centrally in said frame.

A longitudinal groove 15 is formed in the upper surface of the bar to receive a file 16 or other sharpening device. Lugs 17 project from the respective ends of the cutter-bar into vertical grooves 18, formed in the side pieces of the frame, and engaging these lugs upon their upper and lower faces are the adjusting-screws 19, which are positioned in grooves 20, formed in the side pieces of the frame. By adjusting one of these screws inwardly and the other outwardly, and vice versa, the cutter-bar may be swung on its trunnions to bring either the blade or the sharpening device into proper position to coact with or be engaged by the rotary cutters, either for cutting grass or sharpening said cutters.

The sharpening device is not designed to be used when the machine is being operated to cut grass, and therefore when the machine is in operation said sharpening device will not be engaged by the cutters as they revolve.

When traveling to and from the place where the mower is to be operated, the adjusting-screws may be adjusted to swing the bar in proper position for the engagement of the cutters with the sharpening device, as illustrated in Fig. 2, so that said cutters will be sharpened as the machine is moved along the ground.

21 is a roller which engages the ground and is journaled in hangers 22, adjustable vertically in the frame, said roller being positioned in rear of the cutter-bar and supporting the forward end of the machine.

From the above description it will be seen that I have produced a very simple device whereby the cutters may be sharpened without removal from the machine by simply adjusting the cutter-bar to bring the sharpening device in position to be engaged by said cutters as they revolve and then operating the machine to revolve them.

Having thus fully described my invention, what I claim, and desire to secure by Letters Patent, is—

1. In a lawn-mower, the combination with the rotary cutters, and cutter-bar, of a sharpening device carried by the cutter-bar, and means for adjusting the cutter-bar to bring either the cutting edge or the sharpening device in operative position with respect to the rotary cutters, substantially as described.

2. In a lawn-mower, the combination with the rotary cutters, of the pivoted cutter-bar having a cutting edge on one side of its pivot and a sharpening device on the opposite side thereof, and means for adjusting said cutter-bar to bring either the cutting edge or sharpening device in operative position with respect to said cutters, substantially as described.

3. In a lawn-mower, the combination with the rotary cutters, and cutter-bar, of a file carried by said bar, and means for adjusting said cutter-bar to bring either the cutting edge thereof or said file in operative position with respect to the rotary cutters, substantially as described.

4. In a lawn-mower, the combination with the rotary cutters, and the cutter-bar having a longitudinal slot, of a file positioned in said slot, and means for adjusting the cutter-bar to bring either the cutting edge thereof or the file in operative position with respect to the rotary cutters, substantially as described.

In testimony whereof I have signed this specification in the presence of two subscribing witnesses.

JAMES BRODERICK.

Witnesses:
RUBIE J. TRACY,
G. W. TRACY.